United States Patent
Deguchi et al.

(10) Patent No.: US 10,973,216 B2
(45) Date of Patent: Apr. 13, 2021

(54) FISHING REEL CAP

(71) Applicant: Shimano Inc., Osaka (JP)

(72) Inventors: Tomoya Deguchi, Osaka (JP); Nobuo Furuya, Osaka (JP); Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 80 days.

(21) Appl. No.: 16/599,936

(22) Filed: Oct. 11, 2019

(65) Prior Publication Data

US 2020/0187473 A1    Jun. 18, 2020

(30) Foreign Application Priority Data

Dec. 14, 2018   (JP) .............................. JP2018-234792

(51) Int. Cl.
*A01K 89/01*    (2006.01)

(52) U.S. Cl.
CPC .............................. *A01K 89/01123* (2015.05)

(58) Field of Classification Search
CPC ...... A01K 89/011221; A01K 89/01126; A01K 89/01123; A01K 89/016; A01K 89/01928; A01K 89/02; A01K 89/004; A01K 89/006
See application file for complete search history.

(56) References Cited

U.S. PATENT DOCUMENTS

| | | | | |
|---|---|---|---|---|
| 4,898,493 A | * | 2/1990 | Blankenburg | F16B 21/088 403/326 |
| 5,690,290 A | * | 11/1997 | Asano | F16B 37/14 242/283 |
| 5,816,733 A | * | 10/1998 | Ishikawa | B60R 16/027 403/329 |
| 6,029,922 A | * | 2/2000 | Kim | A01K 89/006 242/283 |
| 6,305,627 B1 | * | 10/2001 | Stiner | A01K 89/015 242/283 |
| 9,295,241 B2 | * | 3/2016 | Ikuta | A01K 89/006 |
| 2004/0061011 A1 | * | 4/2004 | Gilmore | A01K 89/0162 242/317 |

FOREIGN PATENT DOCUMENTS

JP    2004-41138 A    2/2004

* cited by examiner

*Primary Examiner* — Emmanuel M Marcelo
(74) *Attorney, Agent, or Firm* — Global IP Counselors, LLP

(57) ABSTRACT

A fishing reel cap for mounting on a reel body of a fishing reel includes a bottomed cylindrical cap body and an annular reinforcing member. The bottomed cylindrical cap body has a cylindrical portion with threads capable of being screwed onto threads on the reel body and projections extending radially outward on an outside surface of the cylindrical portion. The annular reinforcing member has recesses, a portion of each projection of the projections being configured to fit into a respective recess of the recesses, and the annular reinforcing member being configured to fit on the outside surface of the cap body, exposing at least a portion of each of the projections in a radially outward direction.

8 Claims, 5 Drawing Sheets

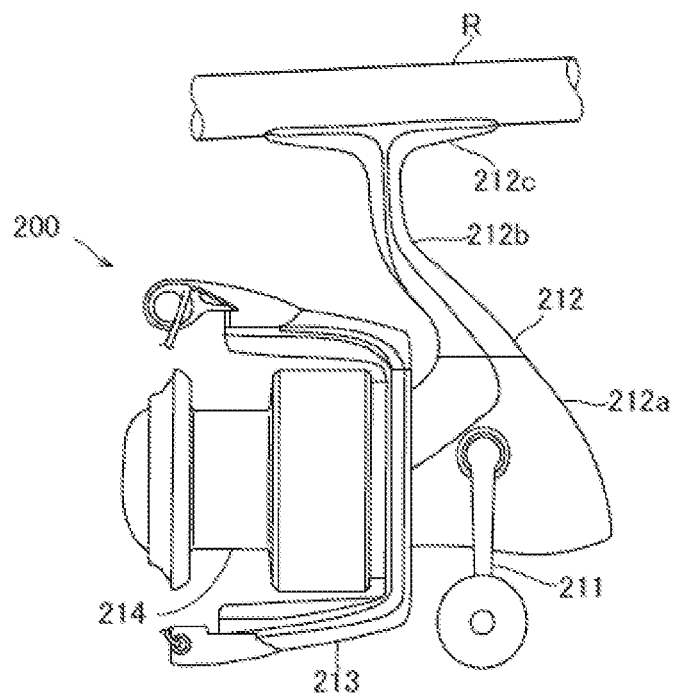
FIG. 1
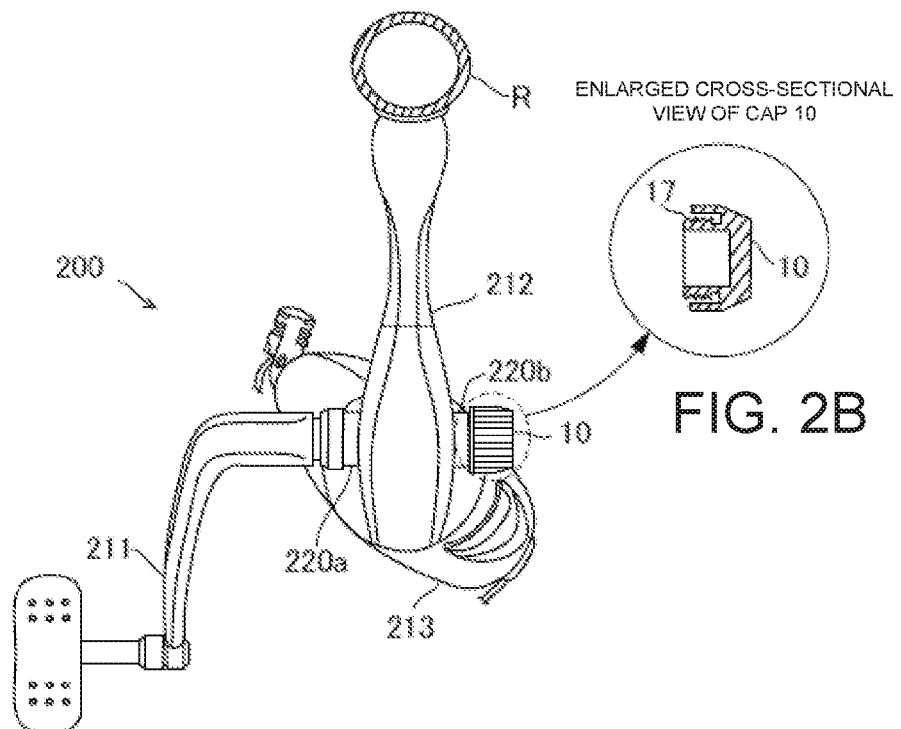
FIG. 2A
FIG. 2B

FISHING REEL CAP

CROSS-REFERENCE TO RELATED APPLICATIONS

This application claims priority to Japanese Patent Application No. 2018-234792, filed on Dec. 14, 2018. The entire disclosure of Japanese Patent Application No. 2018-234792 is hereby incorporated herein by reference.

BACKGROUND

Field of the Invention

The present invention relates to a fishing reel cap that is mounted on a fishing reel and can be turned by hand.

Background Art

In a conventional spinning reel for fishing, in many cases, a fishing rod is held with the dominant hand and the handle is operated by the other hand in order to cast or move tackle underwater. For this reason, a spinning reel is normally configured such that the handle for rotating a rotor can be attached to either the left or the right side, in accordance with the dominant hand of the angler. In the conventional spinning reel, holes are formed in the left and right sides of the reel body such that the handle can be attached to either the left or right handle mounting shaft, and a cap for protecting the handle mounting shaft is attached to the hole to which the handle is not attached.

When live baiting or tying tackle or a lure to a fishing line using a spinning reel, there are situations in which the fishing rod to which the spinning reel is attached is placed on the ground or in a boat. A reel stand, which is attached to the hole on the side opposite to which the handle is attached to prevent the bale or rotor from being damaged when the fishing rod is placed on the ground, is known, for example, as disclosed in Japanese Published Unexamined Application No. 2004-41138. Since the reel stand cancan be a hinderance during casting or when just the reel is carried, the reel stand is not continuously attached to the spinning reel but rather is only attached by the angler for use as a stand. Therefore, it is necessary that the cap that protects the handle mounting shaft is manually removable.

Some dual-bearing reels can have the force to clamp the spool shaft with a friction plate be adjusted in order to adjust the braking force of the spool by a casting control mechanism, as disclosed, for example, in Japanese Laid-Open Patent Publication No. 2013-236606. In order to adjust the clamping force of the friction plate, for example, a cap attached to an extension of the spool shaft of the reel body is turned to change the pressing force of the friction plate. In order to adjust the braking force in accordance with the tackle and the surrounding conditions, it is necessary that the cap be turnable by hand.

When the handle is switched from one side to the other, the cap for protecting the handle mounting shaft of the spinning reel is removed, then attached; and when the reel stand is removed, the protective cap is re-attached. The cap is generally screwed onto threads formed in a handle protection portion and is gripped and turned by hand. It is desirable to provide anti-slip irregularities for manual operation around the outer circumference of the cap. Although fine grooves such as knurling formed on the outer circumference of the cap can easily slip from the fingers, if the cap is a resin-molded article, it is possible to provide irregularities that can more readily be grasped by the fingers.

With resin-molded articles, deformation of the cap is possible if the cap is gripped with a significantly strong force; thus, an annular reinforcing member can be attached to the outer circumference of the cap in order to suppress deformation. However, the attaching of such an annular reinforcing member precludes the provision of irregularities in that portion. Moreover, a detent between the main body of the cap and the reinforcing member would be necessary, so that the overall size of the cap tends to be enlarged in the radial direction. The same applies to a cap for adjusting the braking force of a dual-bearing reel.

SUMMARY

In consideration of the circumstances described above, the object of the present invention is to suppress the deformation of the cap while maintaining the anti-slip effect of the cap that is mounted on the fishing reel and manually turned.

The fishing reel cap according to one aspect of the present invention is mounted on the main body of the reel of a fishing reel, and comprises a bottomed cylindrical cap body, which has a cylindrical portion in which threads are formed that are screwed into the threads formed in the reel body and projections that extend radially outward, which are disposed on an outside surface of the cylindrical portion; and an annular reinforcing member, in which recesses are formed and into which a portion of the projections of the cap body can be fit, and that is fits onto the outside surface of the cap body, exposing at least a portion of the projections in the radially outward direction.

Preferably, the cylindrical portion of the cap body has an inner cylindrical portion in which threads are formed that are screwed onto the threads formed in the reel body, and an outer cylindrical portion that surrounds the outer circumference of the inner cylindrical portion in the radial direction and on the outside surface of which the projection is formed.

Preferably, the reinforcing member covers the outer circumference of the bottom portion side of the cap body.

Preferably, an engagement hole that extends through in the axial direction of the cylindrical portion is formed in the bottom portion of the cap body, and the reinforcing member has an engagement projection that fits into the engagement hole and on which a pawl is formed that engages with the edge of the engagement hole at the inside of the cap body.

Alternatively, the reinforcing member can cover the outer circumference of the edge on the opposite side of the bottom portion of the outer cylindrical portion.

If the reinforcing member covers the outer circumference of the edge on the opposite side of the bottom portion of the outer cylindrical portion, preferably, the reinforcing member has an inner peripheral portion that reaches the bottom portion between the inner cylindrical portion and the outer cylindrical portion; and the fishing reel cap further includes an O-ring that fits on the outside surface of the inner cylindrical portion between the inner cylindrical portion and the outer cylindrical portion.

The fishing reel cap is mounted, for example, on the handle mounting portion of a spinning reel.

Alternatively, the fishing reel cap can also be mounted on a spool shaft supporting portion of a dual-bearing reel.

According to embodiments of the present invention, since the recesses into which a portion of the projections of the cap body can be fit are formed in the annular reinforcing member, which is fits on the cap body, and at least a portion of the projections is exposed in the radially outward direction, it is possible to suppress the deformation of the cap while maintaining the anti-slip effect of the cap.

BRIEF DESCRIPTION OF THE DRAWINGS

FIG. 1 is a side view of a spinning reel to which is attached a fishing reel cap according to an embodiment of the present invention.

FIG. 2A is a rear view of the spinning reel of FIG. 1 to which is attached the fishing reel cap according to a first embodiment.

FIG. 2B in an enlarged cross-sectional view of the fishing reel cap of FIG. 2A.

DETAILED DESCRIPTION OF EMBODIMENTS

Figure 3:
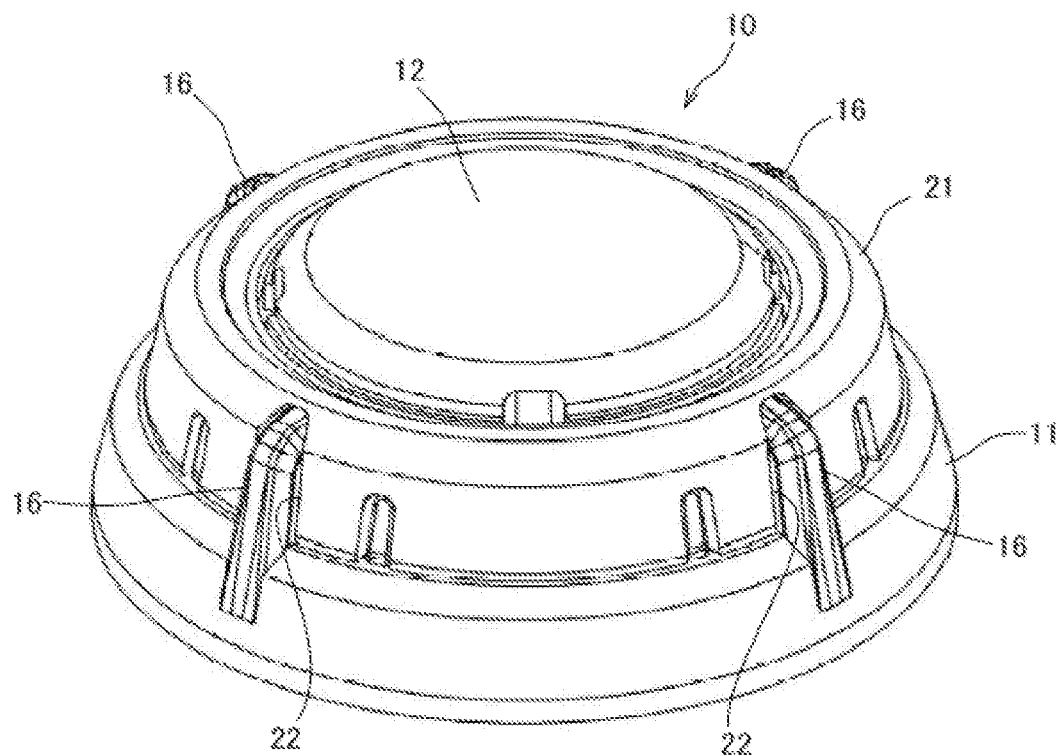
FIG. 3 is an external perspective view of the fishing reel cap according to the first embodiment.

An embodiment of the present invention will be described in detail below with reference to the drawings. Identical or equivalent portions have been assigned the same reference symbols.

First Embodiment

FIG. 1 is a side view of a spinning reel to which is attached a fishing reel cap according to a first embodiment of the present invention. As shown in FIG. 1, the spinning reel 200 is attached to a fishing rod R. The spinning reel 200 winds fishing line about the axis along the longitudinal direction of the fishing rod R in the left-right direction of FIG. 1 and comprises a reel body 212 including a handle 211, a rotor 213 that is supported by a front portion of the reel body 212 so as to be freely rotatable, and a spool 214 for winding the fishing line and that is disposed at the front portion of the rotor 213. In the interior of the reel body 212, the spinning reel 200 includes a mechanism in which the rotor 213 is rotated when the handle 211 is turned to wind the fishing line around the spool 214.

The reel body 212 has a long horizontal mounting portion 212c that is mounted on the fishing rod R, a reel body portion 212a that houses a winding mechanism, and a leg portion 212b that connects the mounting portion 212c and the reel body portion 212a. The reel body 212 is made from a synthetic resin or an alloy such as an aluminum or magnesium alloy.

FIG. 2A is a rear view of the spinning reel to which the fishing reel cap of this embodiment is attached. Cylindrical protection portions 220a, 220b for protecting a handle mounting shaft, which is not shown, and to and from which the handle 211 can be attached and detached, are formed projecting on both the left and right sides of the reel body 212. The handle 211 can be attached to either the left or right handle mounting shaft depending on user preference, and is shown in FIG. 2 attached to the handle mounting shaft on the protection portion 220a side. A cap 10 for protecting the handle mounting shaft is attached to the protection portion 220b on the side on which the handle 211 is not attached.

As illustrated in FIG. 2B, the cap 10 includes male threads 17. Female threads, which are not shown, are formed on the inside of the protection portions 220a, 220b, which can be screwed onto the male screw 17 of the cap 10.

FIG. 3 is an external perspective view of the fishing reel cap according to the first embodiment. The cap 10 includes a bottomed cylindrical cap body 11 and an annular reinforcing member 21 that fits onto an outside surface of the cap body 11, with the bottom central portion of the cap body 11 being exposed. Projections 16 that extend radially outward are disposed on the outside surface of the cap body 11. In the example of FIG. 3, the projections 16 are disposed in four locations on the outside surface. Recesses 22 that expose at least a portion of each of the projections 16 of the cap body 11 in the radially outward direction and into which a portion of the projections 16 fit are formed in the annular reinforcing member 21. The number of the projections 16 and the recesses 22 is not limited to four, but preferably two or more projections 16 are provided. In addition, the circumferential positions of the projections 16 and the recesses 22 are not particularly limited, but are preferably disposed in rotationally symmetrical positions.

Figure 4:
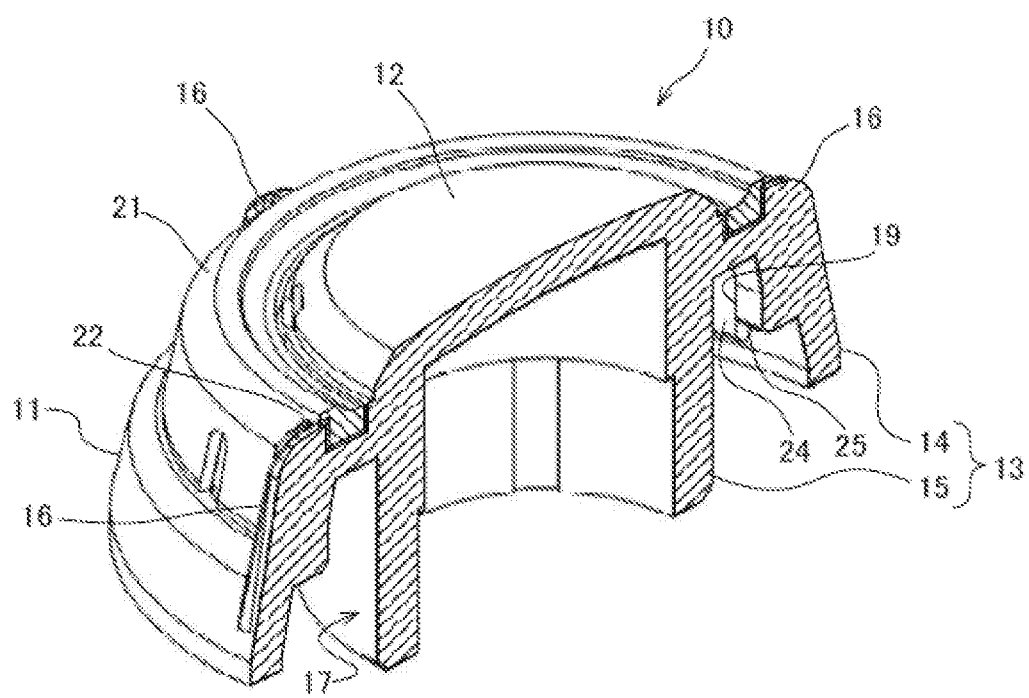
FIG. 4 is a cross-sectional perspective view of the fishing reel cap according to the first embodiment.

FIG. 4 is a cross-sectional perspective view of the fishing reel cap according to the first embodiment. The cap body 11 has an inner cylindrical portion 15, and an outer cylindrical portion 14 that surrounds the outer circumference of the inner cylindrical portion 15 in the radial direction and on the outer side surface of which the projections 16 are formed. The inner cylindrical portion 15 and the outer cylindrical portion 14 constitute a cylindrical portion 13 of the cap body 11. Although the threads are not illustrated in FIG. 4, the male threads 17 that are screwed into the female threads formed in the protection portions 220a, 220b of the reel body 212 are formed on the inner cylindrical portion 15. The reinforcing member 21 covers the outer circumference of the cap body 11 on a bottom portion 12 side and fits to the outside surface of the outer cylindrical portion 14.

An engagement hole 19 is formed in the bottom portion 12 of the cap body 11 and extends through in the axial direction of the cylindrical portion 13. The reinforcing member 21 has an engagement projection 24 that engages the engagement hole 19. A pawl 25 that locks to an edge of the engagement hole 19 on the inner side of the cap body 11 is formed on the engagement projection 24. When the engagement projection 24 is inserted in the engagement hole 19 and pushed in, the pawl 25 of the engagement projection 24 locks to the edge of the engagement hole 19 on the inner side of the cap body 11, and the reinforcing member 21 does not detach from the cap body 11.

Figure 5:
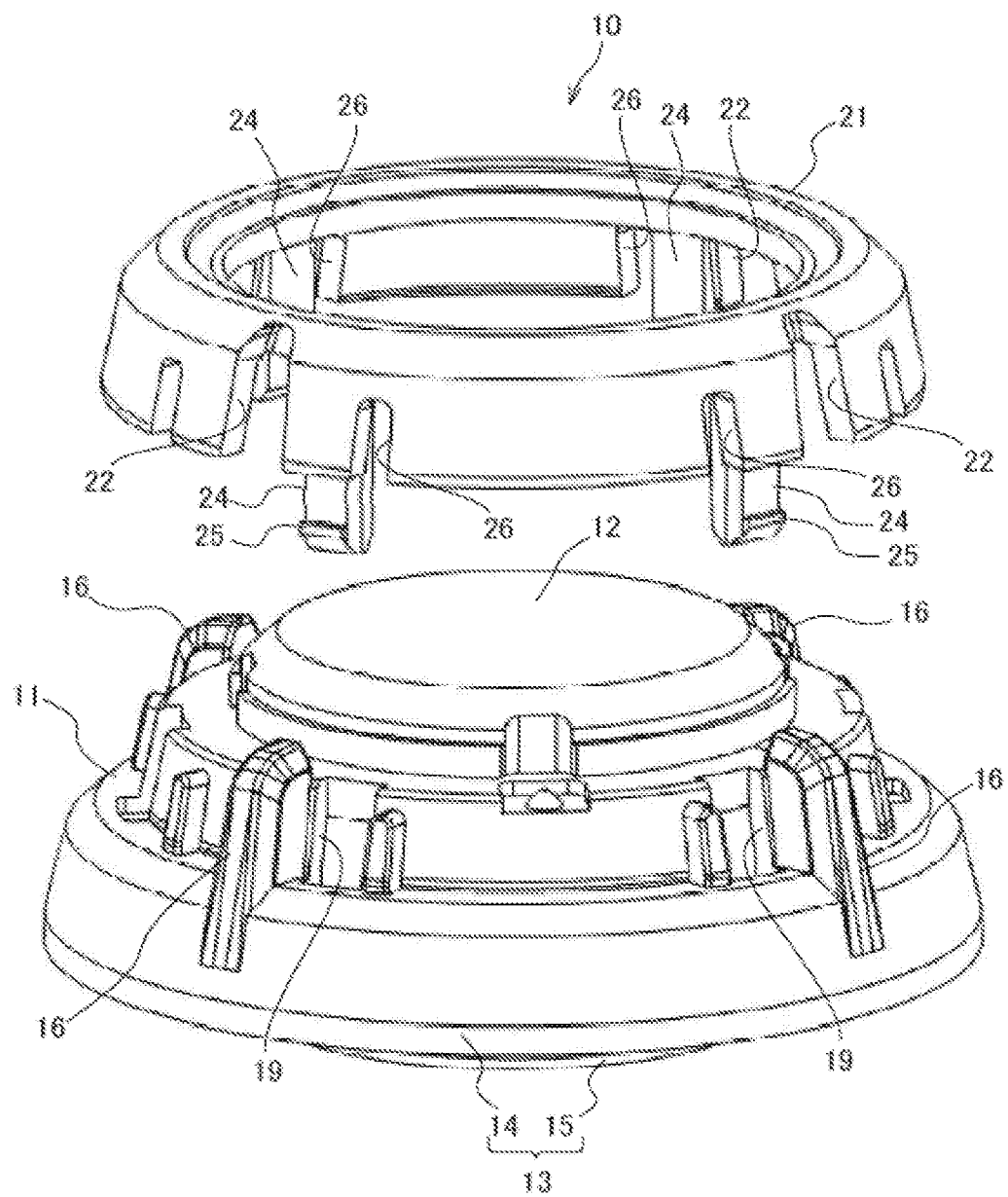
FIG. 5 is an exploded perspective view of the fishing reel cap according to the first embodiment.

FIG. 5 is an exploded perspective view of the fishing reel cap according to the first embodiment. In the reinforcing member 21, the engagement projections 24 are formed in a plurality of annular locations; the example of FIG. 5 shows four rotationally symmetrical locations. In the cap body 11, the engagement holes 19, which extend from the bottom portion 12 to the inside of the cylindrical portion 13, are formed in a plurality of locations on the circumference to match the positions of the engagement projections 24.

When each of the engagement projections 24 of the reinforcing member 21 is inserted into the engagement hole 19 of the cap body 11 and pushed in to fit the reinforcing member 21 on the cap body 11, the pawl 25 of the engagement projection 24 locks to the edge of the engagement hole 19 on the inner side of the cap body 11. When each of the pawls 25 is engaged, since the pawls 25 are oriented in opposite directions, the engagement between the bottomed cylindrical cap body 11 and the annular reinforcing member 21 is securely engaged, and the reinforcing member 21 is not easily detached from the cap body 11. The orientation of the pawls 25 is not limited to the radially outward direction and can be the radially inward direction. In addition, it is also possible to form radially outward pawls 25 on some of the engagement projections 24 and to form radially inward pawls 25 on the other engagement projections 24.

In a state in which the reinforcing member 21 is fitted on the cap body 11, since each of the projections 16 partially fits into a respective recess 22 of the reinforcing member 21, the reinforcing member 21 does not rotate relative to the cap body 11. Since each of the projections 16 is partially exposed from the reinforcing member 21 in the radially outward direction, fingertips of a hand that operates the cap 10 engage the projections 16, thereby preventing the fingertips from slipping. When the cap body 11 is clamped at two opposite locations on the outside surface, the cap body 11 is compressed in the clamped direction and tries to expand in the orthogonal direction, but is suppressed by the annular reinforcing member 21, so that expansion in the orthogonal direction is suppressed, and, as a result, deformation in the compression direction is suppressed. Because deformation of the cap 10 is suppressed when one attempts to turn the cap 10, the cap 10 can be smoothly turned.

Besides the recesses 22 into which the projections 16 fit, the reinforcing member 21 has a notch 26 that is formed adjacent to the engagement projection 24 in the circumferential direction. Due to the formation of the notch 26, the distal end of the engagement projection 24 readily deforms elastically in the radial direction, and when the engagement projection 24 is inserted in the engagement hole 19, the engagement projection 24 flexes so that the pawl 25 can be easily locked.

The method of fixing the reinforcing member 21 to the cap body 11 is not limited to the combination of the engagement hole 19 and the engagement projection 24. For example, it is also possible to employ a method in which a groove that extends in the circumferential direction is formed on the outside surface of the outer cylindrical portion 14 and a convex portion oriented in the radially inward direction is formed on the inner periphery of the edge of the reinforcing member 21, so that the groove and the convex portion engage. The groove and the convex portion can be reversed, so that the convex portion is formed on the outside surface of the outer cylindrical portion 14 and the groove is formed on the inner circumferential surface of the reinforcing member 21, so that the convex portion and the groove engage. The engagement hole 19, the engagement projection 24, the groove, and the convex portion can be used in combination as well. In addition, the reinforcing member 21 can be fixed to the cap body 11 with an adhesive. In addition, the engagement hole 19, the engagement projection 24, and the adhesive can be used in combination, or the groove, the convex portion, and the adhesive can be used in combination.

The structure of the cap 10 according to the first embodiment is not limited to being attached to the protection portions 220a, 220b of the spinning reel 200, as described above. For example, in a casting control mechanism of a dual-bearing reel, female threads can be formed on the inner periphery of a boss portion of the reel body and used as a cap for the casting control mechanism.

Second Embodiment

Figure 6:
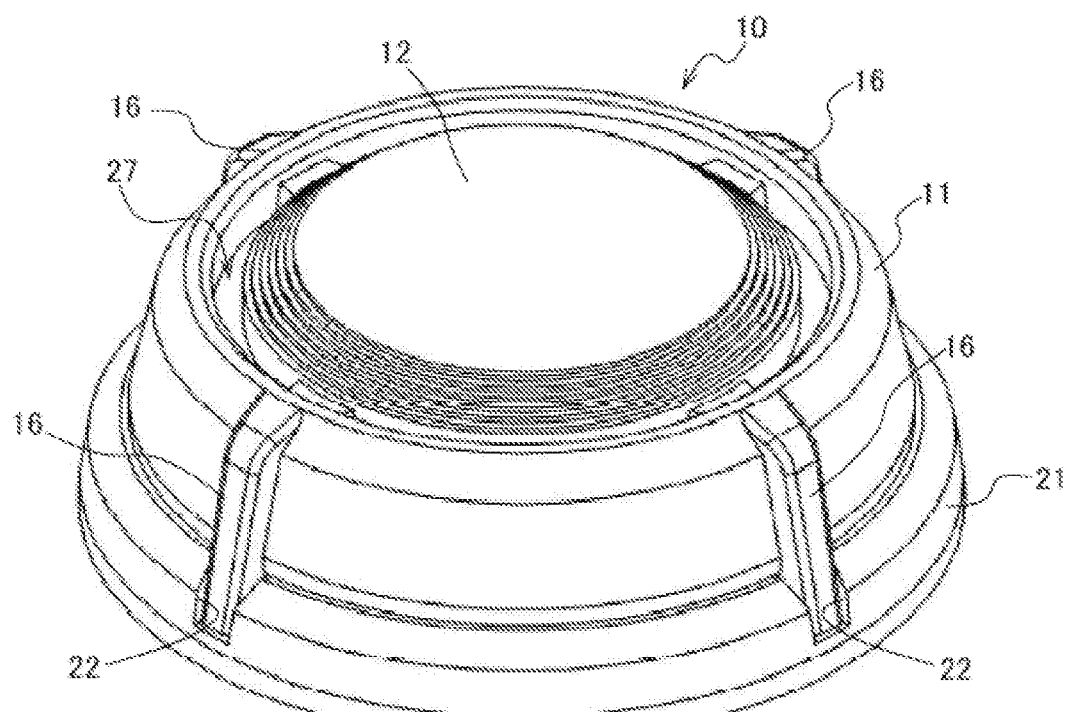
FIG. 6 is an external perspective view of the fishing reel cap according to a second embodiment of the present invention.

FIG. 6 is an external perspective view of the fishing reel cap according to a second embodiment of the present invention. In the same manner as in the first embodiment, the cap 10 is composed of the bottomed cylindrical cap body 11 and the annular reinforcing member 21 that is fits on the outside surface of the cap body 11. In the second embodiment, the reinforcing member 21 covers the outer circumference of the edge on the opposite side of the bottom portion 12 of the cap body 11.

In the same manner as the first embodiment, the projections 16 that extend radially outward are disposed on the outside surface of the cap body 11. In the example of FIG. 6, the projections 16 are disposed in four locations on the outside surface. The recesses 22 that expose at least a portion of each of the projections 16 of the cap body 11 in the radially outward direction and into which a portion of the projections 16 fits are formed in the annular reinforcing member 21. In the second embodiment, a portion of each of the projections 16 fits into a respective recess 22 on the edge side of the cylindrical portion 13. The number of the projections 16 and the recesses 22 is not limited to four, but is preferably two or more.

Figure 7:
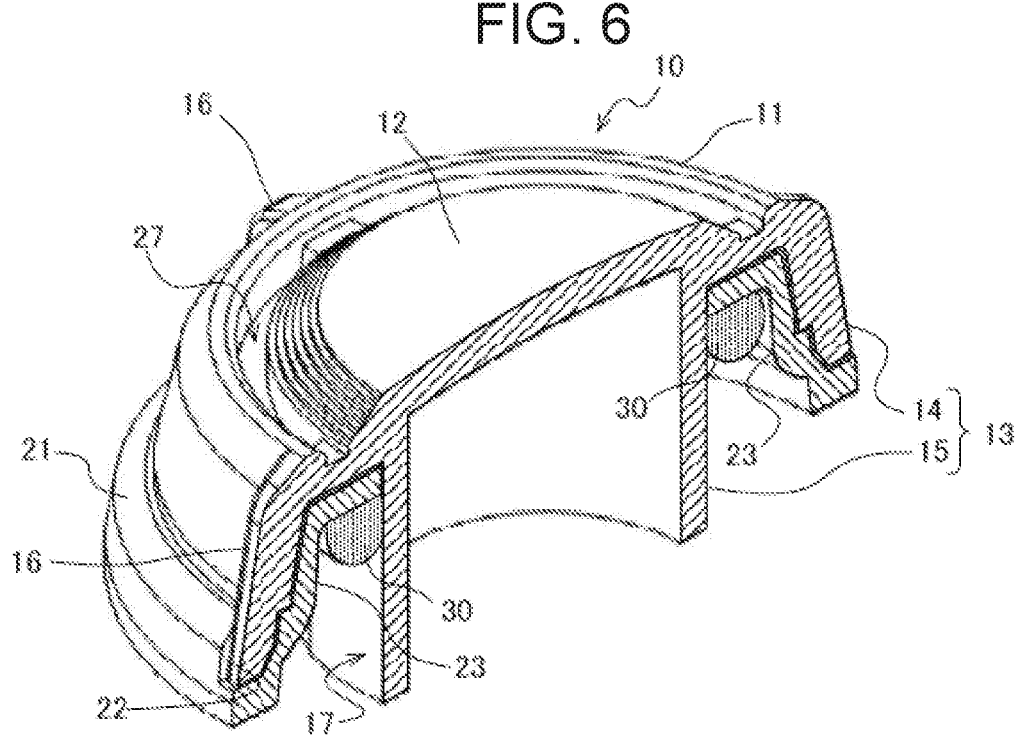
FIG. 7 is a cross-sectional perspective view of the fishing reel cap according to the second embodiment.

FIG. 7 is a cross-sectional perspective view of the fishing reel cap according to the second embodiment. The cap body 11 has the inner cylindrical portion 15 and the outer cylindrical portion 14 that surrounds the outer circumference of the inner cylindrical portion 15 in the radial direction and on the outside surface of which the projections 16 are disposed. The inner cylindrical portion 15 and the outer cylindrical portion 14 constitute the cylindrical portion 13 of the cap body 11. Although the threads are not illustrated in FIG. 7, the male threads 17 that are screwed into the female threads formed in the protection portion of the reel body are formed on the inner cylindrical portion 15. The reinforcing member 21 covers the outer circumference of the edge of the cap body 11 on the opposite side of the bottom portion 12 of the outer cylindrical portion 14 and fits on the outside surface of the outer cylindrical portion 14.

The reinforcing member 21 has an inner peripheral portion 23 that reaches the bottom portion 12 between the inner cylindrical portion 15 and the outer cylindrical portion 14. The reinforcing member 21 is a structure in which the edge of the outer cylindrical portion 14 is sandwiched between the inner peripheral portion 23 and the outer peripheral portion that fits on the outer side surface of the outer cylindrical portion 14. An elastic O-ring 30 that fits on the outside surface of the inner cylindrical portion 15 is disposed between the inner cylindrical portion 15 and the outer cylindrical portion 14. The O-ring 30 prevents the reinforcing member 21 from detaching from the cap body 11. The O-ring 30 abuts the end surfaces of the protection portions 220a, 220b disposed on the reel body 212, also preventing loosening of the cap 10 as well as preventing water and dust from entering the reel body.

Also, in the second embodiment, when the reinforcing member 21 is fitted on the cap body 11, since each of the projections 16 partially fits into a respective recess 22 of the reinforcing member 21, the reinforcing member 21 does not rotate relative to the cap body 11. Since each of the projections 16 is partially exposed from the reinforcing member 21 in the radially outward direction, fingertips of a hand that operates the cap 10 catch the projections 16, thereby preventing the fingertips from slipping. When the cap body 11 is clamped at two opposite locations of the outside surface, the cap body 11 is compressed in the clamped direction and tries to expand in the orthogonal direction but is suppressed by the annular reinforcing member 21, so that the expansion in the orthogonal direction is suppressed, and, as a result, deformation in the compression direction is suppressed. Because deformation of the cap 10 is suppressed when one attempts to turn the cap 10, the cap 10 can be smoothly turned.

Since the reinforcing member 21 of the second embodiment is a structure in which the outer cylindrical portion 14 of the cap body 11 is sandwiched between the inner peripheral portion 23 and the outer peripheral portion that fits on the outside surface of the outer cylindrical portion 14, even if the inner peripheral portion 23 does not reach the bottom portion 12 between the inner cylindrical portion 15 and the outer cylindrical portion 14, the reinforcing member does not readily detach from the cap body 11. The cap body 11 shown in FIGS. 6 and 7 has a gap 27 in the bottom portion 12 between the inner cylindrical portion 15 and the outer cylindrical portion 14. The inner peripheral portion 23 of the reinforcing member 21 closes the gap 27; the inner peripheral portion 23 can be seen from the outside through the gap 27. The portion of the inner peripheral portion 23 that reaches the bottom portion 12 between the inner cylindrical portion 15 and the outer cylindrical portion 14 prevents the O-ring 30 from entering the gap 27.

Third Embodiment

Figure 8:
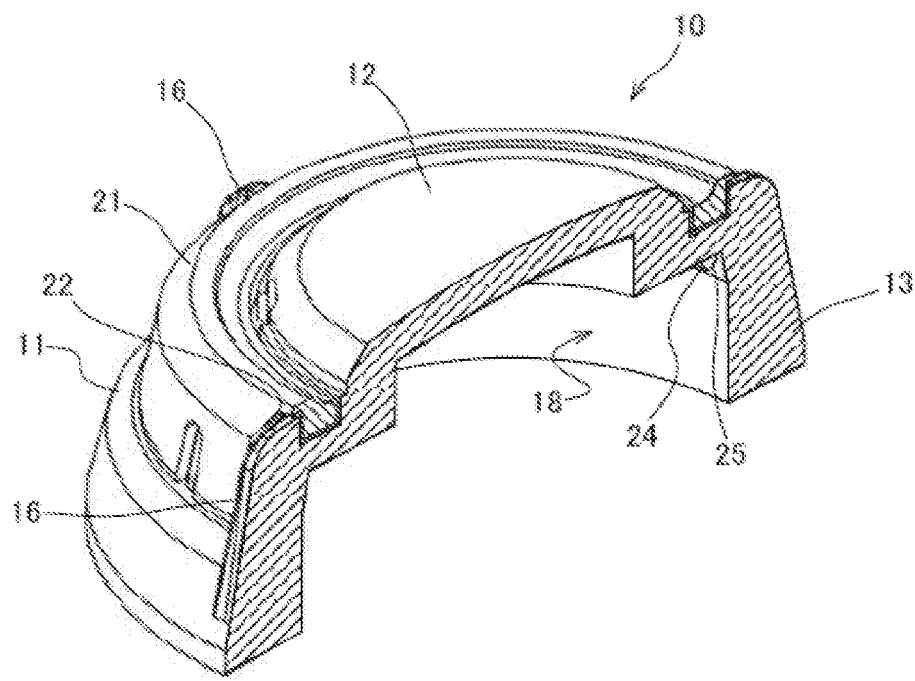
FIG. 8 is a cross-sectional perspective view of the fishing reel cap according to a third embodiment of the present invention.

FIG. 8 is a cross-sectional perspective view of the fishing reel cap according to a third embodiment of the present invention. The cap 10 of the third embodiment is screwed onto a boss portion that is formed protruding from the reel body, such as a cap of a casting control mechanism of a dual-bearing reel. Alternatively, male threads are formed on the outer peripheral portions of the protection portions 220a, 220b of the spinning reel 200, and female threads are formed on the cap 10. In the same manner as in the first embodiment, the cap 10 is composed of the bottomed cylindrical cap body 11 and the annular reinforcing member 21 that fits on the outside surface of the cap body 11. The appearance of the cap 10 of the third embodiment is similar to that of FIG. 3. In the third embodiment, the cylindrical portion 13 does not have the double structure of an outer cylindrical portion and an inner cylindrical portion, but is formed from one cylindrical portion 13. Although the threads are not shown in FIG. 8, female threads 18 are formed on the inner circumferential surface of the cylindrical portion 13. The female threads 18 formed on the inner circumferential surface of the cap body 11 screws onto the male threads formed on the boss portion of the reel body.

In the same manner as in the first embodiment, the cap 10 is composed of the bottomed cylindrical cap body 11 and the annular reinforcing member 21 that fits on an outside surface of the cap body 11 while exposing the central portion of the bottom of the cap body 11. The projections 16 that extend radially outward are disposed in four locations on the outside surface of the cap body 11. The recesses 22 that expose at least a portion of each of the projections 16 of the cap body 11 in the radially outward direction and into which a portion of the projections 16 fits are formed in the annular reinforcing member 21. The number of the projections 16 and the recesses 22 is not limited to four, but is preferably two or more.

The reinforcing member 21 covers the outer circumference of the cap body 11 on the bottom portion 12 side and fits on the outside surface of the cylindrical portion 13. In the same manner as in the first embodiment, a plurality of engagement holes, not shown, are disposed in the bottom portion 12 of the cap body 11 and extend through in the axial direction of the cylindrical portion 13. The reinforcing member 21 has the engagement projection 24 that engages the engagement hole 19. The pawl 25 that is locked to the edge of the engagement hole on the inner side of the cap body 11 is formed on the engagement projection 24. When the engagement projection 24 is inserted in the engagement hole and pushed in, the pawl 25 of the engagement projection 24 is locked to the edge of the engagement hole on the inner side of the cap body 11, and the reinforcing member 21 does not detach from the cap body 11.

When the reinforcing member 21 is fitted on the cap body 11, since each of the projections 16 partially fits into a respective recess 22 of the reinforcing member 21, the reinforcing member 21 does not rotate relative to the cap body 11. Since each of the projections 16 is partially exposed from the reinforcing member 21 in the radially outward direction, fingertips of a hand that operates the cap 10 catch the projections 16, thereby preventing the fingertips from slipping. When the cap body 11 is clamped at two opposite locations on the outside surface, the cap body 11 is compressed in the clamped direction and tries to expand in the orthogonal direction but is suppressed by the annular reinforcing member 21, so that the expansion in the orthogonal direction is suppressed, and, as a result, deformation in the compression direction is suppressed. Because deformation of the cap 10 is suppressed when one attempts to turn the cap 10, the cap 10 can be smoothly turned.

Also, in the third embodiment, as described in the first embodiment, the method of attaching the reinforcing member 21 to the cap body 11 is not limited to a combination of engagement holes 19 and engagement projections 24. It is also possible to employ a method in which a groove disposed on the outside surface of the outer cylindrical portion 14 and a convex portion disposed on the inner periphery of the edge of the reinforcing member 21 are engaged. The reinforcing member 21 can be fixed to the cap body 11 with an adhesive. In addition, the foregoing fixing methods can be used in combination.

Fourth Embodiment

Figure 9:
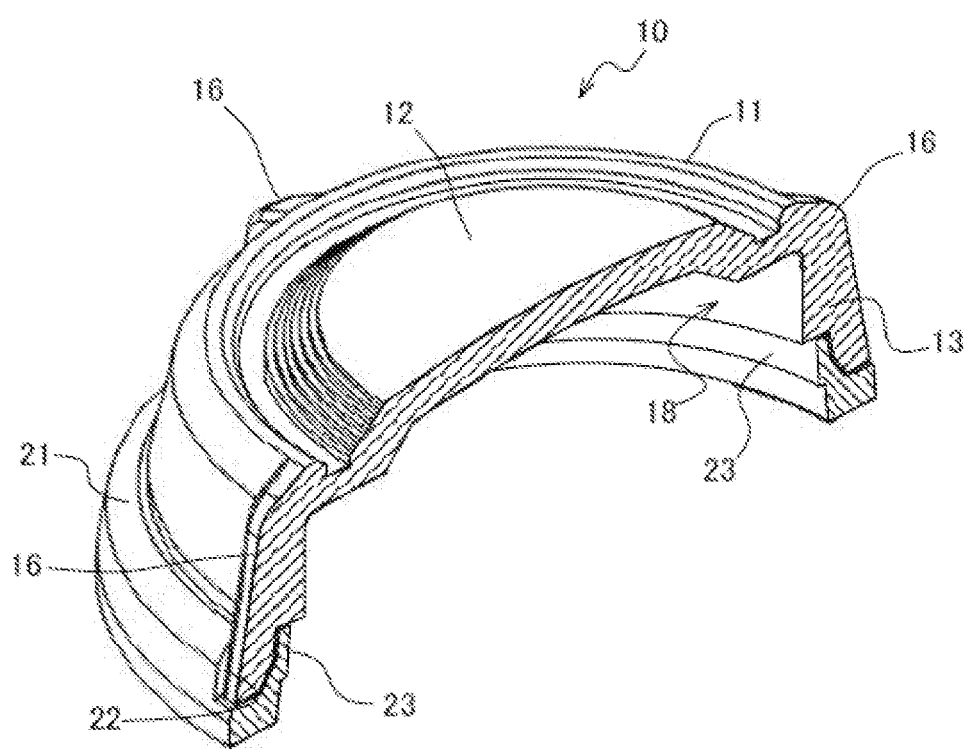
FIG. 9 is a cross-sectional perspective view of the fishing reel cap according to a fourth embodiment of the present invention.

FIG. 9 is a cross-sectional perspective view of the fishing reel cap according to a fourth embodiment of the present invention. In the same manner as in the third embodiment, the cap 10 of the fourth embodiment is screwed onto the boss portion that projects from the reel body. In the same manner as in the first embodiment, the cap 10 includes the bottomed cylindrical cap body 11 and the annular reinforcing member 21 that is fitted on the outside surface of the cap body 11. The appearance of the cap 10 of the fourth embodiment is similar to that of FIG. 6. In the fourth embodiment, the cylindrical portion 13 does not have the double structure of an outer cylindrical portion and an inner cylindrical portion, but is formed from one cylindrical portion 13. Although the threads are not illustrated in FIG. 9, the female threads 18 are formed on the inner circumferential surface of the cylindrical portion 13. The female threads 18 formed on the inner circumferential surface of the cap body 11 screws onto the male threads formed on the boss portion of the reel body.

In the same manner as the second embodiment, four of the projections 16 that project radially outward are disposed on the outside surface of the cap body 11. In the example of FIG. 6, the projections 16 are disposed in four locations on the outside surface. The recesses 22 that expose at least a portion of each of the projections 16 of the cap body 11 in the radially outward direction and into which a portion of the projections 16 is fit are formed in the annular reinforcing member 21. In the second embodiment, a portion of each of the projections 16 fits into a respective recess 22 on the edge side of the cylindrical portion 13. The reinforcing member 21 covers the outer circumference of the edge of the cap body 11 on the opposite side of the bottom portion 12 of the cylindrical portion 13 and is fitted on the outside surface of the cylindrical portion 13. The number of the projections 16 and the recesses 22 is not limited to four, but is preferably two or more.

The reinforcing member 21 is a structure in which the edge of the cylindrical portion 13 is sandwiched between the inner peripheral portion 23 and the outer peripheral portion that is fitted to the outside surface of the cylindrical portion 13. In the cylindrical portion 13 of the cap body 11, a step is provided on the inner circumferential surface, and the reinforcing member 21 fits in the periphery having the larger inner diameter while the female threads 18 are formed on the portion where the inner diameter is reduced by the step.

Also, in the fourth embodiment, when the reinforcing member 21 is fitted to the cap body 11, since each of the projections 16 is partially disposed in the respective recesses 22 of the reinforcing member 21, the reinforcing member 21 does not rotate relative to the cap body 11. Since each of the projections 16 is partially exposed from the respective recesses 22 in the radially outward direction, fingertips of a hand that operates the cap 10 catch the projections 16, thereby preventing the fingertips from slipping. When the cap body 11 is clamped at two opposite locations on the outside surface, the cap body 11 is compressed in the clamped direction and tries to expand in the orthogonal direction but is suppressed by the annular reinforcing member 21, so that the expansion in the orthogonal direction is suppressed, and, as a result, deformation in the compression direction is suppressed. Because the deformation of the cap 10 is suppressed when one attempts to turn the cap 10, the cap 10 can be smoothly turned.

What is claimed is:

1. A fishing reel cap for mounting on a reel body of a fishing reel, comprising:
    a bottomed cylindrical cap body having a cylindrical portion with threads capable of being screwed onto threads on the reel body and projections extending radially outward on an outside surface of the cylindrical portion; and
    an annular reinforcing member having recesses, a portion of each projection of the projections being configured to fit into a respective recess of the recesses, and the annular reinforcing member being configured to fit on the outside surface of the cap body, exposing at least a portion of each of the projections in a radially outward direction.

2. The fishing reel cap according to claim 1, wherein the cylindrical portion of the cap body has an inner cylindrical portion in which the threads that are capable of being screwed onto the threads on the reel body, and an outer cylindrical portion surrounding an outer circumference of the inner cylindrical portion in a radial direction and having an outside surface on which the projections are disposed.

3. The fishing reel cap according to claim 2, wherein the reinforcing member covers the outer circumference of an edge on an opposite side of a bottom portion of the outer cylindrical portion.

4. The fishing reel cap according to claim 3, wherein the reinforcing member has an inner peripheral portion that reaches the bottom portion between the inner cylindrical portion and the outer cylindrical portion, and
    the fishing reel cap further includes an O-ring that fits on the outside surface of the inner cylindrical portion between the inner cylindrical portion and the outer cylindrical portion.

5. The fishing reel cap according to claim 1, wherein the reinforcing member covers an outer circumference of a bottom portion side of the cap body.

6. The fishing reel cap according to claim 5, wherein a bottom portion of the cap body includes engagement holes, the engagement holes extending through of the cylindrical portion in an axial direction, and
    the reinforcing member has engagement projections configured to fit into the engagement holes and each engagement projection of the engagement projections including a pawl configured to engage an edge of an engagement hole of the engagement holes at an inner side of the cap body.

7. The fishing reel cap according to claim 1, wherein the fishing reel cap is configured to be mounted on a handle mounting portion of a spinning reel.

8. The fishing reel cap according to claim 1, wherein the fishing reel cap is configured to be mounted on a spool shaft supporting portion of a dual-bearing reel.

* * * * *